123-46

7/7/87

United States Patent [19]

Nikolich

[11] E Patent Number: Re. 32,452

[45] Reissued Date of Patent: Jul. 7, 1987

[54] PORTABLE GAS-POWERED TOOL WITH LINEAR MOTOR

[75] Inventor: Milovan Nikolich, Wilmette, Ill.

[73] Assignee: Signode Corporation, Glenview, Ill.

[21] Appl. No.: 831,521

[22] Filed: Feb. 20, 1986

Related U.S. Patent Documents

Reissue of:

[64] Patent No.: 4,483,280
Issued: Nov. 20, 1984
Appl. No.: 550,521
Filed: Nov. 14, 1983

U.S. Applications:

[63] Continuation of Ser. No. 227,193, Jan. 22, 1981, abandoned.

[51] Int. Cl.[4] ..... F02B 71/04

[52] U.S. Cl. ..... 123/46 SC; 123/65 VB

[58] Field of Search ..... 227/10; 60/632-633; 123/46 R, 46 H, 46 SC, 188 B, 41.49, 590, 592, 65 V, 65 VB

[56] References Cited

U.S. PATENT DOCUMENTS

| | | | |
|---|---|---|---|
| 1,590,204 | 6/1926 | Powell | 123/590 |
| 2,206,571 | 7/1940 | Kinslow | 123/65 VB |
| 2,302,442 | 11/1942 | Hickey | 123/188 B |
| 2,730,082 | 1/1956 | Wampach | 123/46 SC |
| 2,898,893 | 8/1959 | Rohrer et al. | 60/633 |
| 2,959,159 | 11/1960 | McCrory et al. | 123/46 SC |
| 2,974,651 | 3/1961 | Marden et al. | 123/46 SC |
| 3,042,008 | 7/1962 | Liesse | 123/46 SC |
| 3,120,220 | 2/1964 | McCrory et al. | 123/46 R |
| 3,208,439 | 9/1965 | Ulbing | 123/46 SC |
| 3,213,607 | 10/1965 | Neumeier | 60/633 |
| 3,278,084 | 10/1966 | Neumeier | 123/39 |
| 3,381,672 | 5/1968 | Tobias et al. | 123/46 SC |
| 3,734,206 | 5/1973 | Last | 123/46 SC |
| 3,850,359 | 11/1974 | Obergfell | 227/10 |
| 3,967,771 | 7/1976 | Smith | 227/10 |
| 3,978,827 | 9/1976 | Wallis | 123/46 R |
| 4,075,850 | 2/1978 | Nakazato et al. | 60/633 |
| 4,200,213 | 4/1980 | Liesse | 123/46 SC |
| 4,218,888 | 8/1980 | Jayne | 123/65 VB |
| 4,329,946 | 5/1982 | Longhouse | 123/41.49 |
| 4,365,471 | 12/1982 | Adams | 60/633 |
| 4,377,991 | 3/1983 | Liesse | 123/46 SC |
| 4,403,722 | 9/1983 | Nikolich | 227/10 |
| 4,483,474 | 11/1984 | Nikolich | 123/46 SC |
| 4,522,162 | 6/1985 | Nikolich | 123/46 SC |

FOREIGN PATENT DOCUMENTS

| | | | |
|---|---|---|---|
| 26860 | 10/1984 | Australia . | |
| 26831 | 10/1984 | Australia . | |
| 0123502 | 10/1984 | European Pat. Off. . | |
| 3772 | 1/1977 | Japan | 227/9 |
| 53-34179 | 3/1978 | Japan . | |
| 53-115980 | 10/1978 | Japan . | |
| 115981 | 10/1978 | Japan . | |
| 1592188 | 7/1981 | United Kingdom . | |
| 2076048 | 11/1981 | United Kingdom . | |
| 2076891 | 12/1981 | United Kingdom . | |

OTHER PUBLICATIONS

Obert, Internal Combustion Engines and Air Pollution, 3rd Ed; Jan. 1973, pp. 86-103.

*Primary Examiner*—Craig R. Feinberg

*Attorney, Agent, or Firm*—Dressler, Goldsmith, Shore, Sutker & Milnamow, Ltd.

[57] ABSTRACT

An efficient, portable, easy to operate tool employing a linear motor is disclosed that is powered by the gases produced from the internal combustion of a fuel and air mixture. A supply of liquified gas stored under pressure in a cylinder provides the source of power. The linear motor is slidably mounted within a cylinder to move reciprocally downwardly and upwardly through a driving and return stroke. A combustion chamber is formed at the upper end of the cylinder. A spark plug powered by a piezo-electric firing device is located within the combustion chamber. The combustion chamber features a turbulence generator, such as a fan, driven by an electric motor which is continuously in operation when the tool is in use. A main valve mechanism actuated by a set of lifting rods that are moved upwardly and downwardly when the tool is moved towards and away from the workpiece, is used to control the opening and closing of the combustion chamber and to control the flow of fresh air through the combustion chamber. When the combustion chamber is isolated from the atmosphere and the fuel and air are thoroughly mixed, the spark plug is fired to explode the fuel and air mixture and force the linear motor through its driving stroke. The linear motor is returned to its driving position by a spring or air acting

21 Claims, 12 Drawing Figures

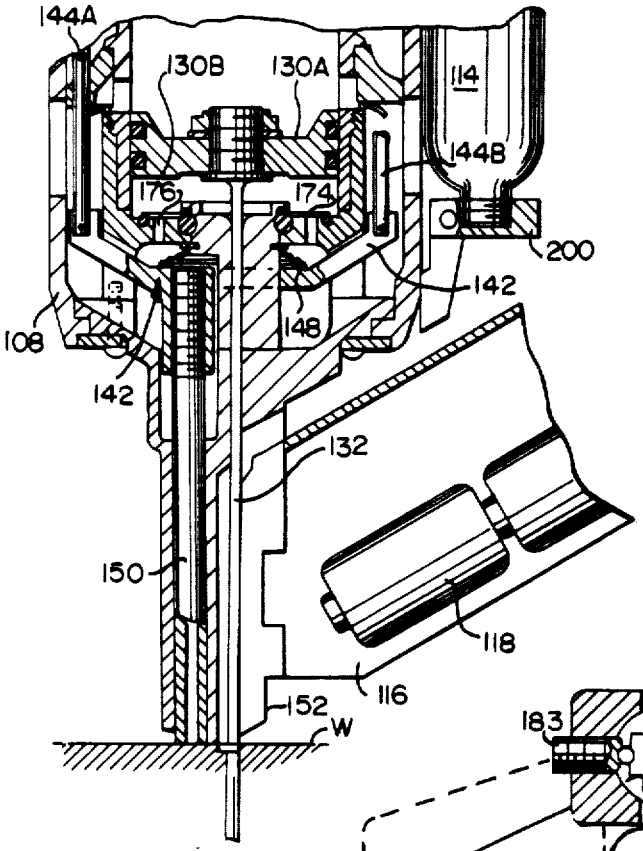
FIG. 3
FIG. 4
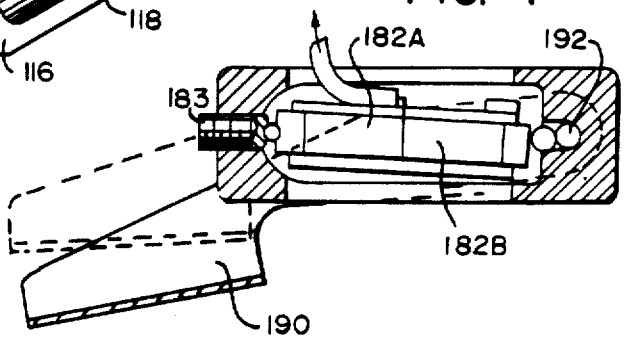
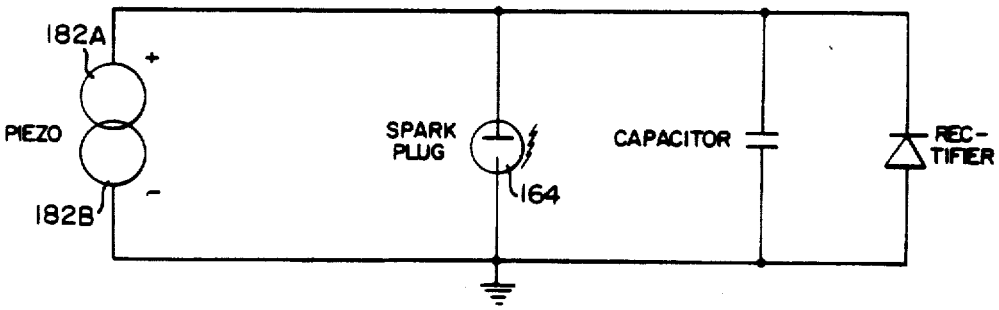
FIG. 5

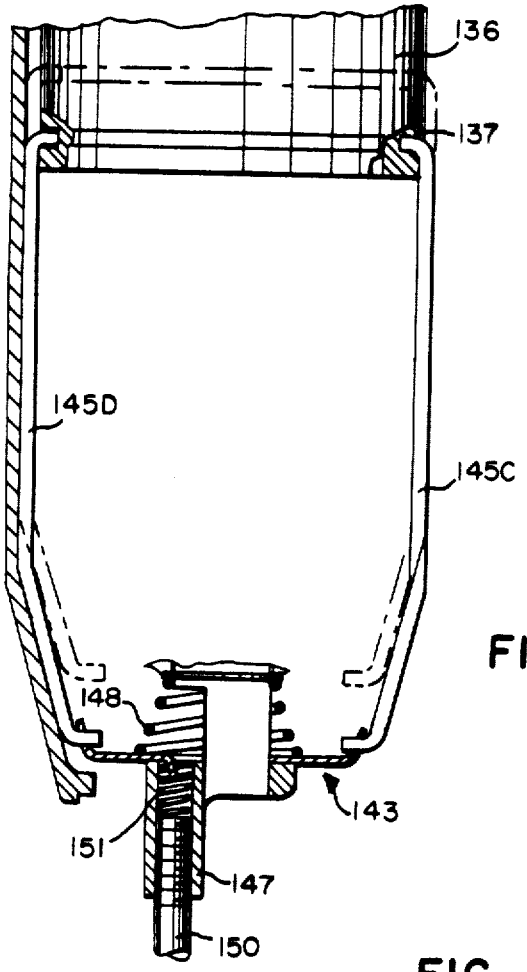
FIG. 7
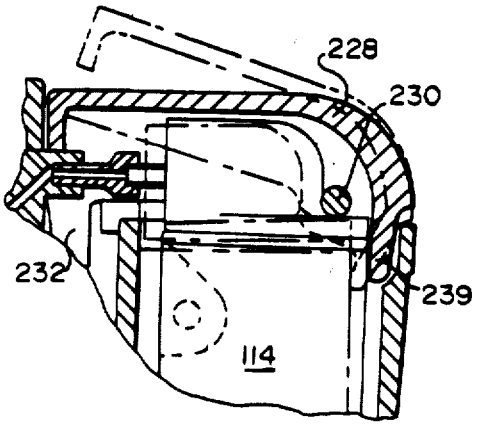
FIG. 9
FIG. 8
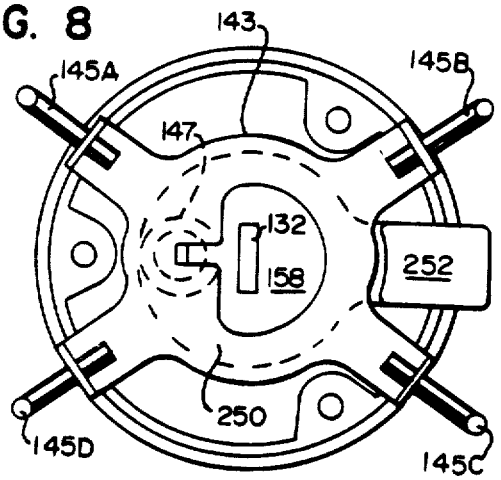

PORTABLE GAS-POWERED TOOL WITH LINEAR MOTOR

Matter enclosed in heavy brackets [ ] appears in the original patent but forms no part of this reissue specification; matter printed in italics indicates the additions made by reissue.

This application is a continuation, of application Ser. No. 227,193, filed Jan. 22, 1981 now abandoned.

TECHNICAL FIELD

This invention relates generally to a portable tool which employs a linear motor that is self-contained and is operated by the products of combustion. It requires no separate starting mechanism. Connected to and operated thereby can be various types of attachments, such as, shearing and cutting devices, marking members, hole piercing devices, etc. In addition, the motor can be used to drive members disposed therebeneath from a magazine; such as hog rings, animal tags and fasteners of all types, including nails, rivets, etc.

Portable-type tools, of course, have been available for long periods of time, and a typical tool is one such as a fastener driving tool for driving nails, or other types of attachments by means of air pressure, battery power, or using some sort of explosive device. Where it is desired to have substantially large forces applied, the compressed air or explosive devices have been used. These types of devices have obvious drawbacks. In the case of compressed air, there is required a compressor which becomes a burden and an inconvenience in addition to the large initial expense required for investment in such equipment. When explosive devices are used, the operating cost of such unit is high and they cannot be operated for any substantial period of time without having to be refilled. Thus, it can be appreciated that where it is desired to have a truly portable tool which is capable of generating large forces without requiring an auxiliary power source, such a tool would have many uses.

SUMMARY OF THE INVENTION

The present invention relates to a portable tool powered by the gases produced from the combustion of a fuel and air mixture within a confined space. The available power acts on a linear motor which through the action of a mechanism connected to the motor can be used to drive fasteners, operate shearing devices, and other attachments that require relatively large forces.

There are illustrated in the attached drawings three embodiments of tools employing a linear motor in which the force output of the linear motor is generated independent of the movement of the motor itself. Specifically, a sealed combustion chamber is provided with a turbulent mixture of fuel and air that is ignited to drive the motor to effectuate the desired action of the tool. No starter or other device is employed.

In one embodiment, there is illustrated a portable tool having a linear motor consisting of a piston having a rod connected thereto. The piston forms one wall of the combustion chamber. The motor is driven in the downward direction and the motor is returned by a spring back to its position to await another firing. In a second and third embodiments, there is illustrated the utilization of the linear motor for driving fasteners into a workpiece. These are, of course, but two specific applications of the present invention and are not intended to be limiting, since obviously the inventive concepts disclosed therein can be used for other purposes in other types of portable tools.

Essentially, the three tools illustrated have in common an arrangement including a main cylinder within a housing that guides a piston during its reciprocation between the driving and return strokes. The piston carries a driving member, which in one case can be connected to a suitable attachment for shearing, cutting, punching, etc., and in the other two embodiments is used to drive a fastener into a workpiece.

A combustion chamber is formed in the housing adjacent the upper end of the main cylinder by the inside of the housing, the piston, and a main valve mechanism which controls the flow of air between the atmosphere and the combustion chamber. In the combustion chamber is located a fan that is started when the tool is gripped, or when a switch associated with the fan is actuated, to provide turbulence in the combustion chamber which increases the efficiency of the tool. In one of the embodiments, the main valve mechanism is controlled by actuation of the trigger, and in the other two embodiments, while the trigger is involved, it is necessary to engage a bottom trip mechanism. The bottom trip mechanisms employed are to insure that in at least those two embodiments the tool cannot be fired unless it is engaged with the workpiece. This is a safety feature for fastener driving tools and need not necessarily be employed, depending on the type of tool and the use to which it is being put.

It is to be noted that the two embodiments illustrated for driving fasteners are described in detail in an application filed simultaneously herewith in the name of the same inventor and assigned to the assignee of the present invention. These embodiments will be described in general detail in this application, and any further specific information desired can be obtained by referring to the aforesaid application and is incorporated by reference herein, if needed, to have a more detailed understanding of the specifics of the two fastened driving tools.

Referring again to the operation of the tools, it is noted that actuation of the trigger results in a metered amount of fuel being introduced into the combustion chamber after the chamber has been sealed and subsequent actuation of a spark plug to ignite the turbulent mixture of gas and air in the dombustion chamber to drive the linear motor, which in this case is a piston. In one instance, the piston is returned to its driving position by a spring, and in the other embodiments, the piston is returned to its driving position by differential air pressure. When the pistons have been returned to their driving positions, they are retained in place by the spring in the first embodiment and by friction in the other two embodiments.

Filed concurrently with this application on Jan. 22, 1981, was an application Ser. No. 227,194, now U.S. Pat. No. 4,403,722 entitled "Combustion Gas-Powered Fastener Driving Tool," in the name of the same inventor and assigned to the same assignee. This application is directed to fastener driving tools employing a motor of the general type set forth herein.

Numerous other advantages and features of the invention will become readily apparent from the following detailed description of the described embodiments, from the claims, and from the accompanying drawings.

BRIEF DESCRIPTION OF THE DRAWINGS

FIG. 3 is a partial cross-sectional side elevational view of the fastener driving tool as shown in FIG. 2 illustrating the position of the major components located at the lower end of the barrel section at the end of the linear motor driving stroke;

FIG. 4 is an enlarged partial cross-sectional side elevational view of the components forming the ignition mechanism of the embodiment of FIG. 2;

FIG. 5 is a schematic diagram illustrating the ignition circuit of the embodiment of FIG. 2;

FIG. 7 is a partial cross-sectional side elevational view illustrating details of the safety trip mechanism used in the tool shown in FIG. 6;

FIG. 8 is a partial cross-sectional plan view of the fastener driving tool of FIG. 7 taken along line 8—8;

FIG. 9 is an enlarged cross-sectional view of the cap operation of the fuel injection mechanism of the tool illustrated in FIG. 7;

DETAILED DESCRIPTION

Figure 1:
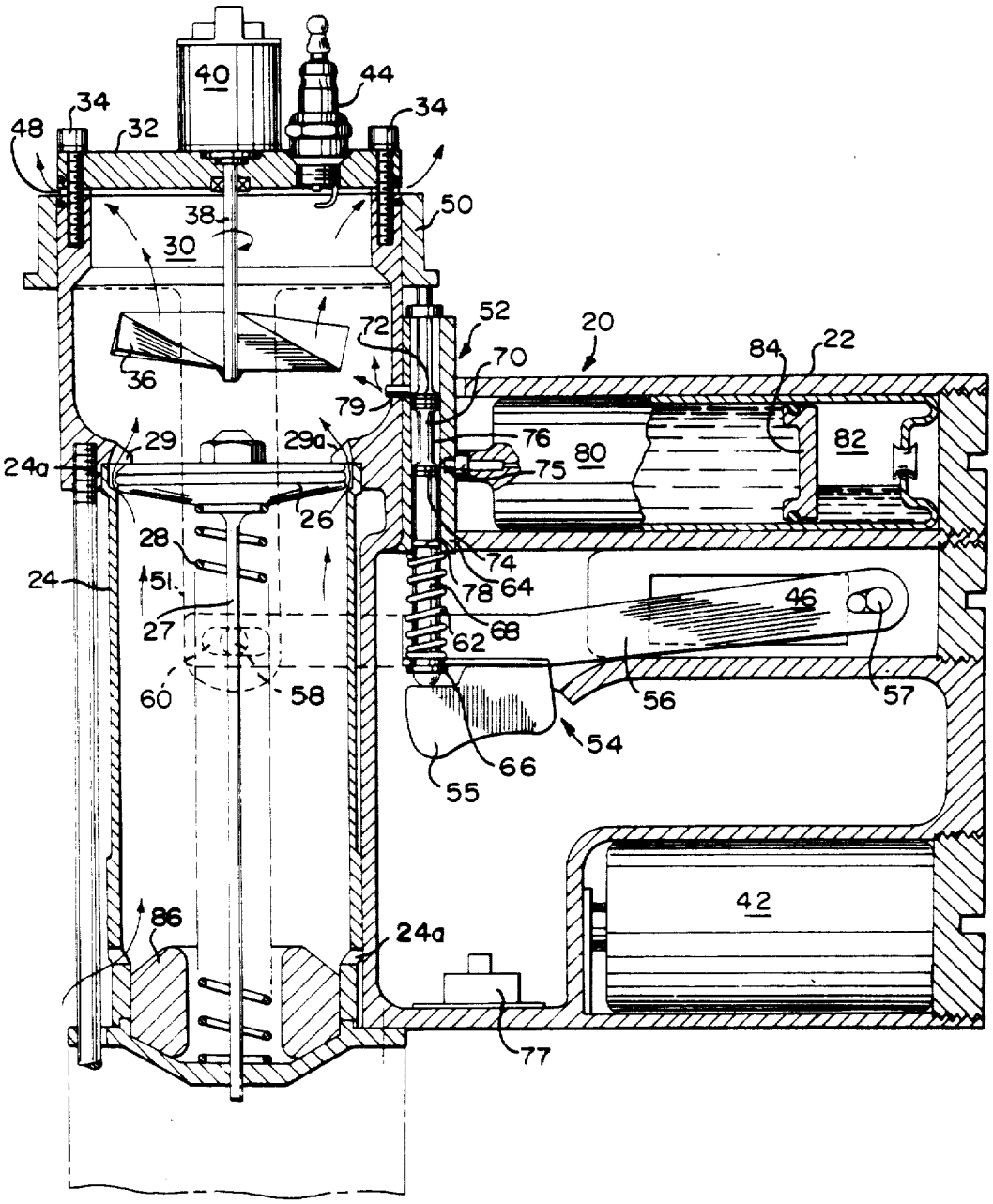
FIG. 1 is a partial cross-sectional side elevational view of a portable tool embodying the subject invention and illustrating the relative position of the principal components prior to the tool being operated.

This invention is susceptible of being used in many different types of tools. There is shown in the drawings and will herein be described in detail three embodiments of the tools incorporating the invention, with the understanding that these embodiments are to be considered but exemplifications, and that it is not intended to limit the invention to the specific embodiments illustrated. The scope of the invention will be pointed out in the claims.

EXTERIOR FEATURES

FIG. 1 illustrates a tool 20 including a housing 22 forming a handle portion of the tool and a cylinder 24 in which the linear motor, herein a piston 26, is disposed. Connected to the piston 26 is an operator or working member 27, which is connected to the desired attachment to be operated by the linear motor, or which can engage various devices for introduction into the workpiece, or for any other disposition. The linear motor or piston 26 is retained in the position shown by a spring 28. The housing 22 includes stop members 29 which extend radially inwardly to limit the upward travel of the piston 26.

Located within the housing 22 between a cap 32, the piston 26 and the adjacent sidewalls of the housing 22 is a combustion chamber 30. The cap is maintained in position relative to the housing by bolts 34.

Located within the combustion chamber 30 is a fan blade 36 which is connected to a shaft 38 operated by the electric motor 40. Actuation of the motor results in the fan creating a turbulence in the combustion chamber, which aids in increasing the efficiency of the tool by providing an improved air-fuel mixture, and improved ignition and flame propagation. The electric motor 40 is operated by a battery 42 located in the handle portion of the tool and interconnected by suitable connections, not shown. Also disposed in the combustion chamber is the spark plug 44, which is ignited by a suitable circuit described hereinafter.

It is to be noted that provision is made for a space 48 to be provided between the cap 32 and the housing 22 to permit the exhausting of gases from the combustion chamber 30 when the sleeve 50 surrounding the housing 22 is in the position shown in FIG. 1 as is shown by the directional arrows. Cylinder 24 includes a slightly enlarged diameter upper end 24a, so that air can flow around the piston 26 and associated O-ring when the piston is in the raised or driving position of FIG. 1, and stop members 29 are circumferentially spaced from one another to define gaps 29a through which air may flow into the combustion chamber. A plurality of air inlet openings 24b are provided adjacent the lower end of cylinder 24 for introducing air into the cylinder.

Extending downwardly from the sleeve 50 is a depending portion 51 which is interconnected to the trigger mechanism 54 in the following manner. The trigger mechanism 54 includes a trigger 55 which is connected to a link 56, the left-hand end of which is connected to the depending portion 51 through a pin 58 extending through a slot 60 in the link 56. Thus, it can be seen that upward movement of the trigger 55 will result in upward movement of the sleeve 50 to close off the combustion chamber from atmospheric air.

The operation of the trigger 55 also operates the fuel control mechanism 52. The fuel control mechanism includes a rod 68 that extends downwardly into engagement with the trigger 55. This position is maintained as shown in FIG. 1 by a compression spring 62 which extends between the fuel control valve housing 64 and a flange 66 integral with the rod 68.

The details of the fuel control mechanism include the housing 64 and the valve stem 70 which is provided with lands 72, 74. The space between the stem 70, housing 64, and lands 72, 74 defines a metering chamber 76. In the position shown in FIG. 1, fuel is provided in the metering chamber 76 from the fuel container assembly 80 by the action of a fuel control valve 75. When the trigger 55 is moved upwardly the land 74 blocks off the entrance from the fuel container 80 and the land 72 unblocks the port 79 to interconnect the metering chamber 76 with the combustion chamber 30. Thus, the metered amount of fuel is introduced into the combustion chamber upon upward movement of the trigger 55. The design is such that the metering chamber 76 is opened to the combustion chamber 30 after the sleeve 50 has closed off the combustion chamber from the atmosphere.

A switch 77 is mounted on the housing of the tool, and is connected by suitable means, not shown, to the fan motor 40 so that the fan is operated when the switch 77 is actuated. It should be noted that the operator shall engage the fan switch 77 which turns the fan on to provide turbulence in the chamber 30 prior to operating the tool by movement of trigger 55. In addition, it is seen that the fuel container assembly 80 includes a pressurized chamber 82 which acts against the piston 84 to maintain the fuel in the container 80 in liquid form. The trigger further acts to force together crystals located in a piezoelectric device schematically illustrated at 46. Effectively upward movement of the link 56 about pivot pin 57 acts to force together two crystals disposed in device 46 to generate a voltate to power the spark plug 44. Further details of the device will be described in conjunction with FIGS. 4 and 5 herein, which specifically illustrate a piezoelectric device and the firing circuit.

Briefly, this tool operates as follows. First, the fan is started by engaging the switch 77. Upward movement of the trigger 55 closes off the combustion chamber 30 by moving the sleeve 50 to close off the exhaust port 48. As this occurs, further upward movement of the rod 68 introduces the fuel from the metering chamber 76 into the combustion chamber 30. The upward movement of the trigger 55 energizes the piezo-electric system 46, which provides a spark to the plug 44, which ignites the fuel to drive the linear motor piston 26 downward against the action of the spring 28. As soon as the piston 26 begins to move through its driving stroke, the O-ring thereon seals against the sidewall of cylinder 24 and air below the piston is expelled through openings 24b. When the piston 26 reaches the driven position at the end of its driving stroke, it engages a resilient bumper 86 at the lower end of cylinder 24.

When the trigger is released, the sleeve 50 moves downwardly and the chamber 30 is opened to atmosphere through ports 48. The fan blades have a slight pitch to scavenge the rest of the gases and introduce the fresh air into the combustion chamber for the next firing, as is clear from the directional arrows. The piston 26 is returned to the position shown in FIG. 1 by the spring 28, and a second metered quantity of fuel is provided to the chamber 76, so that the tool is in position to be fired a second time.

Reference is now made to FIGS. 2–5, which illustrate a portable fastener driving tool employing the novel linear motor.

Figure 2:
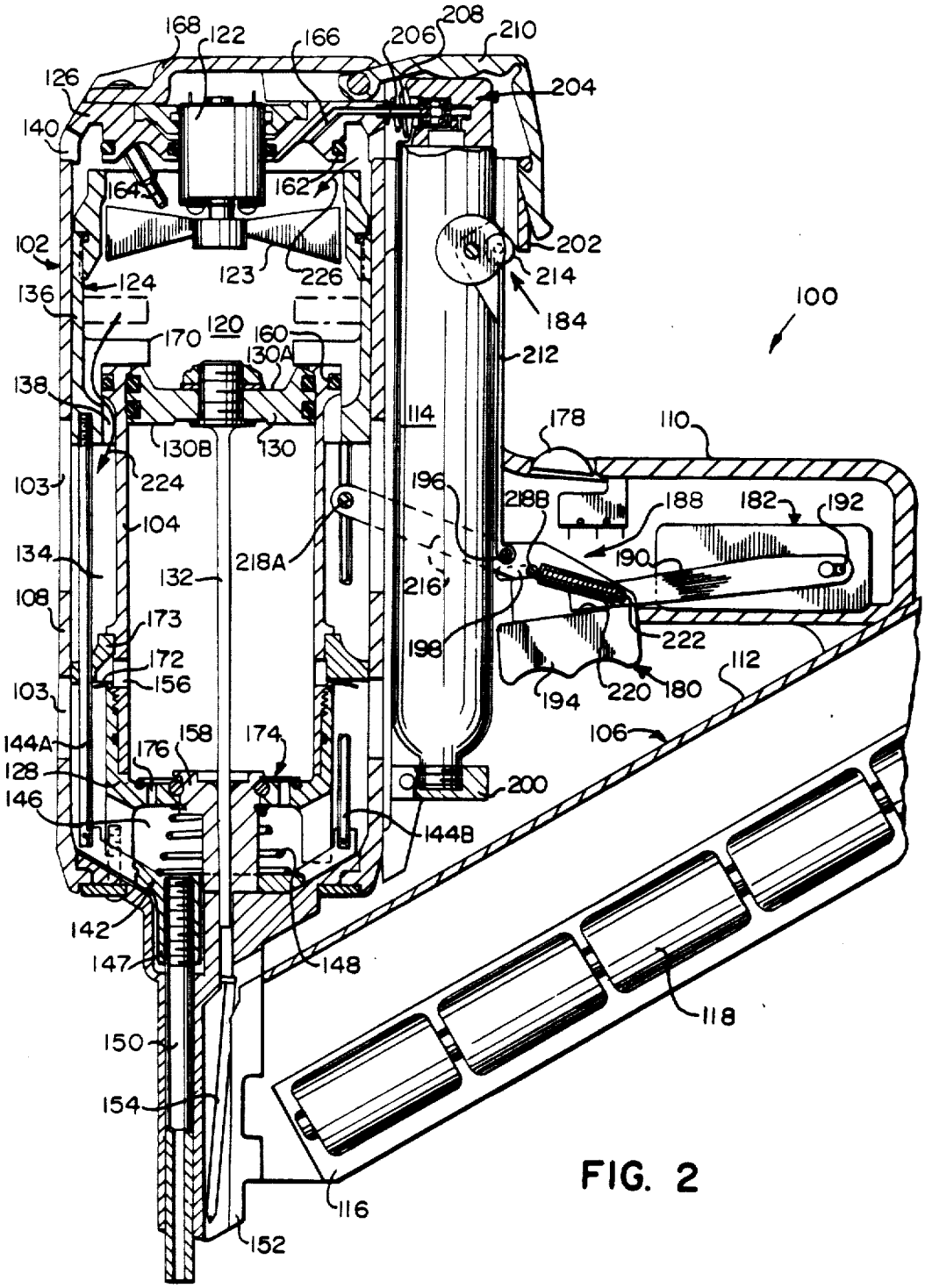
FIG. 2 is a partial cross-sectional side elevational view of a second embodiment of the present invention, a fastener driving tool, and illustrating the position of the principal components before the tool has been fired.

Referring first to FIG. 2, there is illustrated a fastener driving tool 100, the principal components of which are attached to or carried by a generally hollow housing 102. The housing 102 of the tool 100 has three major sections: a barrel section 108, a graspable, elongated handle section 110 extending horizontally outwardly from a position generally midway of the barrel section, and a base 106 extending under the barrel section and the handle section. Located within the barrel section 108 is a main cylinder 104 in which the linear motor is located. Included in the base 106 is a magazine assembly 112 holding a row of nails disposed transversely to the path of a fastener driver 132 that is connected to and operated by the linear motor, which in this case is a working piston assembly 130.

The lower end of the barrel section 108 carries a guide assembly 152 which guides the fastener driver toward the workpiece. The magazine 112 supplies fasteners serially under the fastener driver 132 into the guide assembly 152 to be driven into the workpiece. The base 106 also supports a holder 116 containing a plurality of dry cells which form the power source 118.

A fuel tank 114 is mounted between the barrel section 108 and the handle portion 110 of the housing 102. The fuel tank 114 is filled with a liquefied, combustible gas kept under pressure, such as, MAPP gas or propane, which vaporizes when it is discharged into the atmosphere. The fuel tank 114 is supported by a pivoted lower bracket 200 and a fixed, generally U-shaped upper bracket 202. The upper end of the fuel tank 114 carries a valve assembly 204 for metering fuel out of the tank. A flexible plastic cover 210 pivotably joined to a cover member 168 fits into the upper bracket 202 to retain the fuel tank in place. The cover 210 is opened when the fuel tank 114 must be replaced. The cover 210 provides a downward force which snugly holds the lower end of the fuel tank within the lower bracket 200. At this point, it should be noted that the upper bracket 202 has an inside dimension greater than the outside dimension of the fuel tank 114.

In particular, this dimension is selected so that when the upper end of the fuel tank is forced towards the upper end of the barrel section 108 of the housing 102, the valve assembly 204 will be actuated to dispense a metered quantity of fuel. The manner in which this is accomplished will be explained after the interior components of the tool have been described.

BARREL SECTION

At the interior of the lower end of the barrel section 108 of the housing 102, there is located the open-ended cylinder 104. The cylinder will hereinafter referred to as the "main cylinder." The diameter of the main cylinder 104 relative to the diameter of the barrel section 108 of the housing 102 is such that an open generally annular zone or region 134 is formed. The barrel section of the housing 102 is formed with perihperal openings 103, which allows air to pass freely around the exterior of the main cylinder 104.

The driving piston 130 is mounted within the main cylinder and carries the upper end of the fastener driver 132. The upper end of the barrel section 108 of the housing 102 carries an electrically powered fan 122 and a main valve mechanism 124, which controls the flow of air between the combustion chamber 120 and atmosphere. The upper end of the housing located above the fan is closed by the cylinder head 126. The main valve mechanism 124 includes an upper cylinder 136, which together with the cylinder head 126, the main cylinder 104, and the piston 130 forms the combustion chamber 120. The electric fan includes a set of blades 123 which are joined to the output shaft of the electric motor 122.

The main cylinder 104 is closed at its lower end by a cup-shaped support casting 128 that is suitably supported in the barrel section. Located near the bottom of the cylinder 104 are a series of exhaust ports 156 that are closed off by exhaust valves 172 that are located to control the flow of gas out of the cylinder 104 when the piston linear motor 130 passes the ports 156. Connected to the cylinder 104 adjacent the ports 156 is an annular ring-shaped casting 173. At the bottom of the cylinder 104, a seal 158 is used to plug the center of the support casting 128. Also located in the support casting 128 are a plurality of ports 176 which interconnect the bottom of the cylinder 104 with the chamber 146 in which there is located a spring 148 for reasons to be described hereinafter.

The piston 130 moves between the opposite ends of the main cylinder 104. The upward and downward movement of the piston defines the driving and return strokes of the piston. As previously mentioned, valves 172 permit exhausting of the gas above the piston when the piston passes the ports 156 and the valves 174, which remain closed during the downward movement of the piston, provide for a compression of the air beneath the piston to provide a bumper preventing the piston from engaging the bottom of the cylinder. These valves 174 also function to open and introduce air into the space between the piston after the piston begins to be returned to its driving position. The piston 130 carries the fastener driver, which extends through the seal 158 and into the guide assembly 152. The guide assembly is configured to pass individual fasteners 154 that are disposed therein by the magazine 112, so that when the piston 130 is driven through its driving stroke a fastener is driven into a workpiece.

It is to be noted that the piston 130 includes a pair of O-rings that are sized so that the frictional force between the piston and the inside sidewalls of the main cylinder is sufficiently great so that in the absence of the differential pressure across the piston it will remain in place relative to the interior sidewalls of the main cylinder when it is returned to its driving position. The upward movement of the piston 130 is limited by an overhang of the cylinder 104.

The cylinder 136 constituting the valve control for the combustion chamber is free to move between the lower position shown in solid lines in FIG. 2 wherein the combustion chamber is open to atmosphere to permit air to flow in, as shown by the arrows 226 and an upper position shown in dotted lines wherein the combustion chamber is sealed off from the atmosphere by the O-ring 162 provided in the cap 126 and the O-ring 160 provided in the main cylinder 104. Air is thus free to enter through the upper opening 140 when the tool is in the position shown in FIG. 2 and expended combustion gas is free to exit from the combustion chamber 120 through the opening 138. The downward movement of the cylinder 136 is limited by engagement of inwardly extending fingers 170 on cylinder 136 with cylinder 104.

It is essential to provide turbulence in the combustion chamber 120 to maximize the operating efficiency of the tool.

When the chamber 120 is opened to atmosphere, the position and configuration of the rotating fan blades 123 causes a differential pressure across the combustion chamber 120. This action creates movement of air in the chamber 120 and forces air in (arrow 226) through the upper openings 140 and out (arrow 224) through the lower openings 138. When the combustion chamber is sealed off from the atmosphere, and turbulence is created in the combustion chamber by rotation of fan 123, fuel is injected and the mixture is ignited. The flame propogation enhanced by the turbulence substantially increases the operating efficiency of the tool.

To insure that the tool cannot be fired until it is in engagement with the workpiece, the movement of the cylinder 136 is effected by a bottom trip mechanism which is operated when the tool is brought into contact with a workpiece into which a fastener is to be driven. In the embodiment illustrated in FIG. 2, it includes a spring-loaded casting to which are connected lifting rods that are used to raise and lower the cylinder 136. Specifically, a Y-shaped casting 142 is located in the chamber 146 between the guide assembly 152 and the lower end of the support casting 128. Connected to the casting are three lifting rods 144A, B and C which interconnect the casting 142 to the cylinder 136. Extending downwardly from the casting 142 is a cylinder mount 147. The spring 148 in the chamber 146 acts to bias the casting 142 into the position shown in FIG. 2. Located within the cylindrical mount 147 is the main lifting rod 150 which when moved upwardly moves the rods 144A, B, and C upwardly, which carries with it the cylinder 136 to close off the combustion chamber. The design is selected so that engagement of the main lift rod with the workpiece raises the cylinder 136 the prescribed amount to the broken line position shown in FIG. 2 to seal the combustion chamber. Accordingly, when the tool is lifted off from the workpiece, the spring 148 biases the lifting rod 150 downwardly to move the cylinder 136 to the full line position shown in FIG. 2 wherein the combustion chamber is open to atmosphere.

All the major components fitting within the barrel section 108 of the housing 102 have been described with the exception of those components that are joined to the cylinder head 126.

The cylinder head 126 carries the electric fan 122, a spark plug 164, and provides an internal passageway 166 through which fuel is injected into the combustion chamber 120.

The components located within the handle section 110 of the housing 102 will now be described.

HANDLE SECTION

The handle section 110 contains the controls used to operate the tool 100. In particular, the handle section 110 contains a "deadman's" switch 178, a trigger mechanism 180, a piezoelectric firing circuit 182, which activates the spark plug 164, a portion of a fuel ejecting mechanism 184, which introduces fuel into the combustion chamber 120 via the passageway 166 in the cylinder head 126, and a firing circuit interlock mechanism 188, which locks and unlocks the trigger mechanism 180.

The deadman's switch 178 is mounted at the top of the handle 110. It is suitably connected through appropriate mechanism to operate the electric motor 122 to drive the fan 123. Thus, it can be seen that when the user of the tool grips the handle in the forward position, the fan 122 is actuated to provide turbulence in the combustion chamber 120.

The trigger mechanism 180 mounted in the handle includes a lever 190 which is pivotally connected to a piezoelectric firing circuit 182 by a pin 192. The trigger button 194 is joined by a pivot pin 196 to the fuel ejecting mechanism 184.

The fuel ejecting mechanism 184 which functions to introduce a prescribed metered amount of fuel into the combustion chamber, includes an actuating link 212 which interconnects the trigger 194 to a camming mechanism 214. The operation of the trigger through the linkage 212 and camming mechanism 214 acts to move the fuel tank 114 to the left, which results in depression of the outlet nozzle 206 to introduce a metered amount of fuel into the passageway 166 from the metered valve assembly 204. It is noted that the tank 114 is retained in position by means of the cover 210 which is interengaged with the upper bracket 202. When the trigger is released, the spring 208 acts to return the fuel tank to the position in FIG. 2.

The fuel injected into the combustion chamber 120 is ignited by a spark plug 164 powered from the piezoelectric firing circuit 182. FIGS. 4 and 5 illustrate the firing circuit 182. According to the piezoelectric effect, voltage is produced between opposite sides of certain types of crystals 182A, 182B when they are struck or compressed. Here a camming mechanism actuated by the lever 190 and pivot pin 192 is used to force together the two crystals 182A, 182B. An adjusting screw 183 sets the preload to the assembly. A schematic diagram of the electrical circuit between the spark plug 164 and the piezo-electric firing circuit 182 is illustrated in FIG.

5 and includes a capacitor C and a rectifier R. The capacitor C stores energy until the spark discharges, and the rectifier R permits spark to occur when the trigger is squeezed and not when the trigger is released. The piezo-electric firing circuit 182 is tripped when the lever 190 is raised upwardly by the trigger mechanism 180. Before the firing circuit can be refired or recycled, the lever 190 must be lowered to cock the cam used to force the two crystals 182A and 182B together.

There remains to describe the firing circuit interlock mechanism which precludes firing of the tool until all components are in their proper position. This includes links 216 which are connected to the trigger mechanism 180 by a tension spring 220 and a pivot pin 222. Connecting links 216 are located on opposite sides of the fuel tank 114. It can be appreciated that with the pin 218B located in the slotted opening 198 of the handle 110 that until the cylinder 136 is moved upwardly by the upward movement of the rods 144A, B, and C, the trigger cannot be actuated to form the spark to ignite the fuel in the combustion chamber. Upward movement of the rods 144A, B, and C moves the links 216 upwardly and withdraws the pin 218B out of the slot 198, thus permitting the trigger 194 to be moved upwardly to introduce the metered fuel into the combustion chamber and actuate the piezoelectric circuit. Stated another way, the trigger cannot be actuated to introduce fuel and create a spark until the workpiece is engaged to move the guide assembly upwardly, which moves the casting 142 upwardly to free the trigger 194.

Briefly, the tool disclosed in FIGS. 2–5 operates as follows.

Grasping of the tool 110 engages the deadman's switch 178 to start the fan motor 122 to rotate the blades 123 to provide turbulence in the combustion chamber 120. With the electric fan running, a differential pressure is produced across the combustion chamber, which acts to force fresh air in (arrow 226) through the upper openings 140 and out (arrow 224) through the lower opening 138. The rotating fan blades produce a swirling turbulent effect within the combusiton chamber. Any combustion gases remaining in the combustion chamber due to the previous operation of the tool are thoroughly scavenged and discharged from the combustion chamber by operation of the electric fan 122.

When the tool is positioned on the workpiece, the main lifting rod is depressed, as shown in FIG. 3, which overcomes the force of the biasing spring 148 to move lifting rods 144A, B, anc C, and the cylinder 136 from its lower position shown in solid lines to its upper position shown in dotted lines to seal off the combustion chamber 120. This upward movement of the lifting rods also activates the firing circuit interlock mechanism 188. That is to say that the links 216 and associated pins 218B are pulled out of the slot 198, thus permitting the trigger 194 to be moved upwardly. Upward movement of the trigger 194 actuates the fuel injecting mechanism by moving the container to the left through the action of the linkage 212 and camming mechanism 214. This results in engaging the metering valve assembly 204 to introduce a metered amount of fuel into the passageway 166 and the combustion chamber 120. During upward movement of the trigger 194, the crystals 182A and 182B are forced together to actuate the piezo-electric firing circuit 182, which fires the spark plug 164 in the combustion chamber 120.

The rapid expansion of the exploding air and fuel mixture pressurizes the upper face 130A of the piston 130 and drives the fastener driver downwardly wherein it forces a fastener 154 into a workpiece. In addition, the movement of the piston 130 through its driving stroke compresses the air within the main cylinder 104 bounded by the lower face of 130B of the piston and the inside of support casting 128. As the pressure increases below the piston 130, the exhaust valve means 172 on the sidewalls of the main cylinder 104 pops open. As long as the exhaust valve means 172 is open, the pressure cannot build up on the lower face 130B of the piston 130. When the piston 130 passes below the ports 156, the air bounded by the lower face of the piston and the inside of the support casting is now isolated from the atmosphere, and the pressure on the lower face 130B of the piston rapidly increases. Effectively, a compression chamber has been formed in the lower end of the main cylinder which functions as a bumper to prevent the piston from striking the support casting 128.

Once the piston 130 has passed the ports 156 on the sidewalls of the main cylinder 104, the combustion gases are free to flow out of the main cylinder 104 through the exhaust valve means 172 to the atmosphere. The temperature of the gases in the combustion chamber rapidly drops from approximately 2000° F. to 70° F. in about 70 milliseconds due to the expansion of the gases as the piston moves downwardly and the cooling effect of the walls surrounding the expanding gases, and this sudden temperature drop produces a vacuum within the combustion chamber 120. Once the pressure within the combustion chamber is below atmosphere, the exhaust valve means 172 shuts off.

As soon as the pressure on the upper face 130A of the piston 130 is less than the pressure on the lower face 130B, the piston will be forced upwardly through its return stroke. Initially, this upward movement is caused by the expansion of the compressed air within the compression chamber (see FIG. 3). Subsequent movement is caused by the pressure of the atmosphere, since the thermal vacuum formed within the combustion chamber 120 is on the order of a few psia. Additional air is supplied to the lower face 130B of the piston 130 through the return valves 174 which are operated by the atmospheric pressure. The piston 130 will continue upwardly until it engages the lip on the cylinder and will remain suspended at the upper end of the main cylinder by virtue of the frictional engagement between the sealing rings and the cylinder wall plus the force of the seal 158 on the fastener driver 132.

If the tool 100 is then lifted clear of the workpiece the main lifting rod 150 is forced outwardly by its main biasing spring 148. Since the electric fan 123 is still in operation, any remaining combustion gases are forced out of the lower openings 138, and fresh air is drawn in through the upper openings 140. This prepares the tool for firing another fastener into the workpiece. When the trigger button 194 is released the piezo-electric system 182 is reset or cocked for a subsequent firing period. When the main lifting rod 150 is driven downwardly by the biasing spring 148, the lock pin 218B within the firing circuit interlock mechanism 188 is forced back into the slotted opening 198 in the housing. This prevents subsequent operation of the trigger mechanism until the tool 100 is properly positioned on the workpiece and the combustion chamber is isolated from the atmosphere.

Referring now to FIGS. 6–9, there is illustrated another embodiment of a portable fastener driving tool employing the novel linear motor described hereabove.

The fastener driving tool illustrated in FIGS. 6-9 is similar in many respects to that illustrated in FIGS. 2-5. The portions of the tool in FIG. 6 that are substantially identical with those illustrated in FIG. 1 have been given the same numerals and will only be briefly referred to herein. However, the aspects of the tool in FIGS. 6-9 that differ from those illustrated in FIGS. 2-5 will be dealt with in detail.

Figure 6:
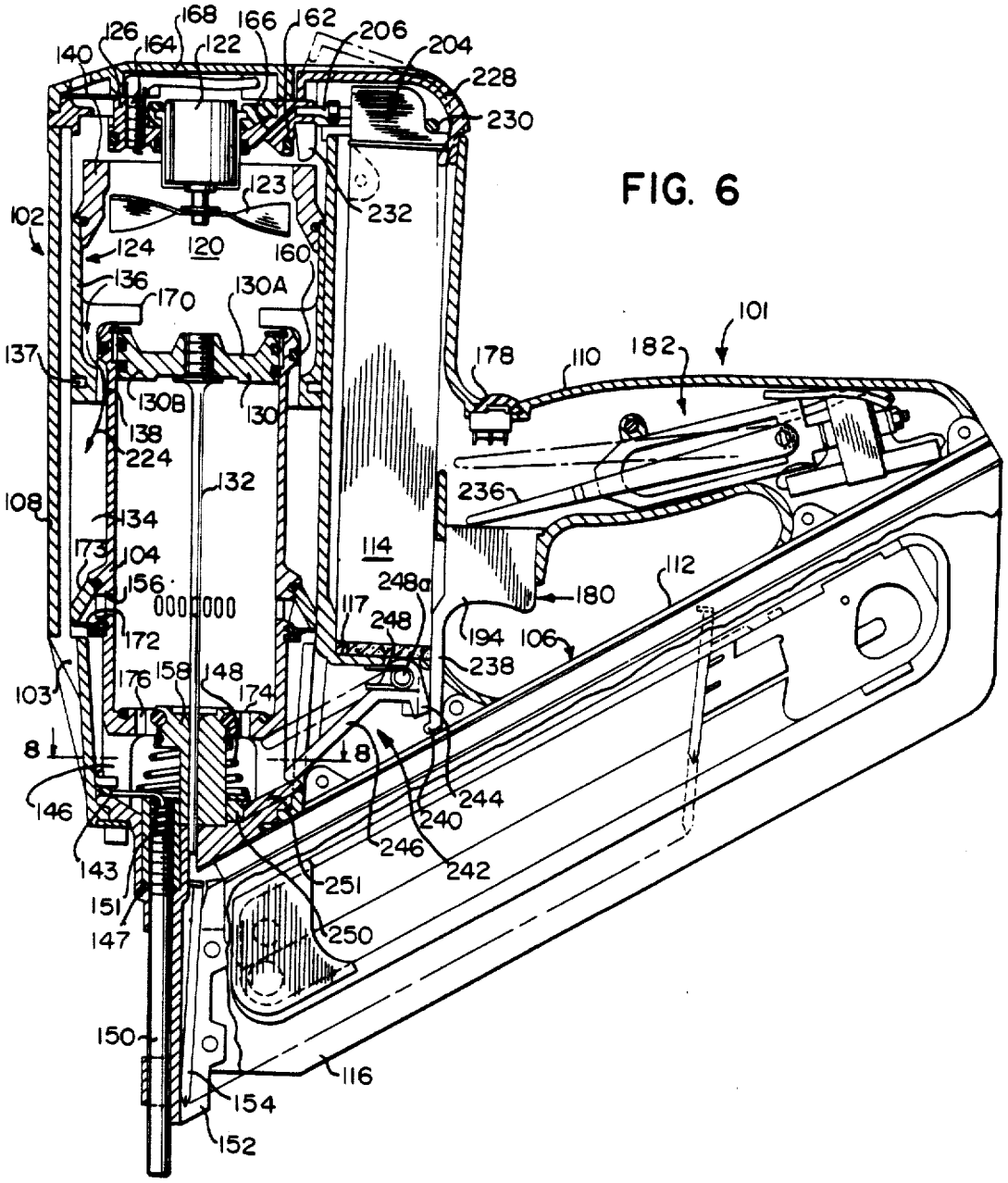
FIG. 6 is a view similar to FIG. 1, but illustrating a third embodiment of a tool embodying the present invention.

The principal components of the second embodiment of the fastener driving tool 101 disclosed in FIG. 6 are very similar to those in FIG. 1 in that the tool in FIG. 6 contains housing 102 including a barrel section 108, a graspable elongated handle section 110 extending outwardly from a position generally midway of the barrel section, and a base 106 extending under the barrel section and the handle section. Included in the base 106 is a magazine assembly 112 holding a row of nails disposed transversely to the path of the fastener driver 132. Essentially, the barrel section of the tool including the fan 122, piston assembly 130, main valve means 124, and a bottom trip safety mechanism are very similar to that disclosed in FIGS. 2-5, except for those differences to be discussed hereinafter. Specifically, the mechanism for positioning the upper cylinder 136 that constitutes a main valve means to control the opening and closing of the combustion chamber 120 is slightly different from that disclosed in FIG. 2. Briefly, upward movement of the lifting rod 150 by bringing the tool into contact with the workpiece acts to move the rod support 143 upwardly against the action of the spring 148. As shown in FIGS. 7 and 8, the rod support 143 is essentially X-shaped and connected to each of these leg portions are lifting rods 145A, 145B, 145C, and 145D, which, as shown in FIG. 7, have their upper ends disposed in the annular slot 137 of cylinder 136. Engagement of lifting rod 150 with the workpiece will raise the rod support 143 and rods 145A-D to move cylinder 136 upwardly and bring the upper portion of cylinder 136 into sealing contact with O-ring 162 and the lower portion of cylinder 136 into sealing contact with O-ring 160 to seal off the combustion chamber.

Another difference between the two embodiments is that in the embodiment shown in FIG. 6, upward movement of the cylinder 136 acts to introduce a metered amount of fuel into the combustion chamber. This action takes place through the action of the cylinder 136 engaging depending arm 232 of the cap 228. Upward movement of the cap 228 acts to pivot the cap 228 about the pivot pin 230, with the result that valve assembly 204 is moved inwardly to admit a metered amount of fuel into the passageway 166 leading into the combustion chamber 120. Counterclockwise movement of the fuel tank 114 is permitted by the resilient pad 117 upon which the tank 114 rests within its support.

Other differences from the tool of FIG. 1 located in the barrel portion of the tool include a spring 151 within the cylindrical mount 147, which spring is disposed between the rod support 143 and the lifting rod 150 to insure that the lifting rod will always be moved to its outward position when the tool is moved away from the workpiece, irrespective of whether or not the cylinder 136 has been moved to its downward position by the action of the spring 148.

Another difference between the two embodiments is the bottom safety mechanism disclosed in FIG. 6, which prevents movement of the trigger to bring about firing of the tool until the tool engages a workpiece. The tool of FIG. 6 employs a safety latch mechanism 242, which when the tool is out of engagement with the workpiece is positioned so that the latch arm 244 thereof prevents trigger actuating movement of the trigger 194 by virtue of engagement between the latch arm 244 and the flange 240 that extends outwardly from the trigger leg 238 of the trigger 194. The trigger latch 242 is maintained in the position shown by the action of a torsion spring 248 which is located about the pin 248a whereby the safety latch is connected to the tool housing 110. It is seen that the latch 242 is moved out of engagement with the trigger 194 by the upward movement of the lifting rod 150. The lifting rod 150 is connected to the ring 250 through the cylindrical mount 147. The ring 250 has an arm 252 that is normally in engagement with the latch arm 246. Thus, when the lift rod 150 moves upwardly, the ring arm 252 pivots the safety latch 242 in a clockwise direction to move the latch arm 244 out of engagement with flange 240. The trigger 194 is now free to move and its upward movement moves the lever 236, which actuates the piezoelectric circuit to send a charge to spark plug 164 and ignite the fuel and air mixture contained in the combustion chamber.

OPERATION OF TOOL ILLUSTRATED IN FIGS. 6-9

Grasping of the handle 110 in the forward position by the user will trip the deadman's switch 178 and start the electric fan 122. When the tool is put into contact with a workpiece, the main lifting rod 150 is moved upwardly against the spring 148 to raise cylinder 136 and seal off the combustion chamber 120. As in the case with the tool illustrated in FIG. 2, the actuation of the electric fan before the upward movement of the cylinder 136 results in there being swirling, turbulent air in the combustion chamber.

The upward movement of the cylinder 136, in addition to sealing off the combustion chamber, results in introduction of a metered amount of fuel into the combustion chamber through passageway 166. This occurs as a result of the cylinder 136 engaging the depending arm 232 of the cap 228, which acts to swing the cap 228 upwardly and move the tank 114 in a counterclockwise direction to actuate the fuel valve assembly to dispense a metered amount of fuel into the chamber 120.

The upward movement of the lifting rod 150 moves the safety latch 242 in a clockwise direction to disengage the latch from the trigger mechanism to permit the trigger 194 to move upwardly. Upward movement of the trigger 194 results in actuating the piezo-electric firing circuit which fires the spark plug 164 in the combustion chamber 120. The piston 120 is then driven downwardly to drive a nail into a workpiece. The return action of the piston and the scavenging of the combustion chamber is identical with that which occurs in the tool of FIG. 2, and further repetition of that operation is not believed necessary.

FUEL SUPPLY FOR EMBODIMENTS OF FIGS. 2-5 AND FIGS. 6-9

Figure 10:
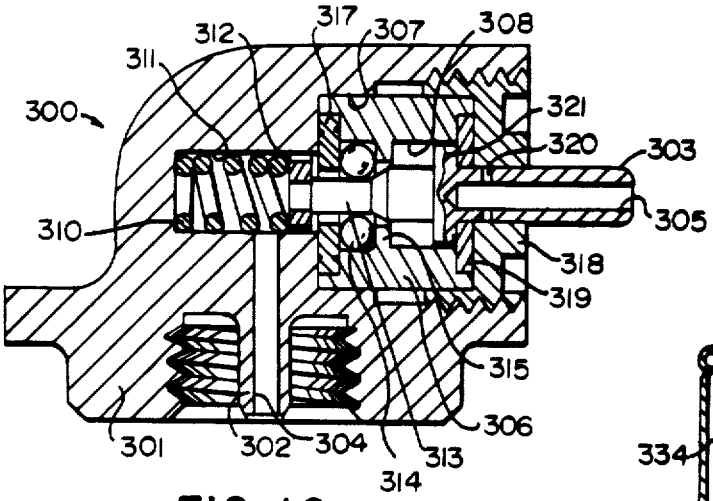
FIG. 10 is an enlarged cross-sectional view of the fuel metering valve of the present invention.
Figure 11:
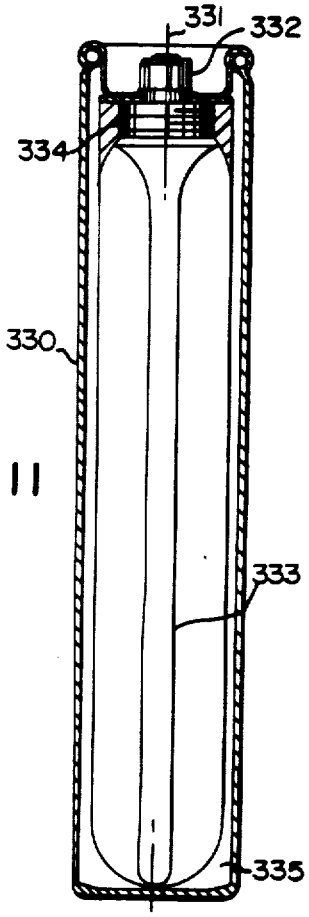
FIG. 11 is an enlarged cross-sectional view of a source of fuel used with the present invention.
Figure 12:
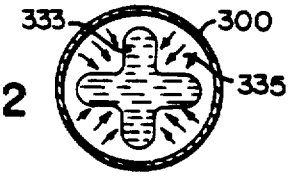
FIG. 12 is a cross-sectional view taken along line 12—12 of FIG. 11.

A preferred form of metering valve is shown generally at 300 in FIG. 10. Valve 300 includes a valve body 301 having a fuel inlet stem 302, and a fuel outlet stem 303 having passages 304 and 305, respectively. Valve body 301 includes a bushing 306 seated within a generally cylindrical cavity 307, and bushing 306 is provided with a cylindrical cavity 308 which defines a metering chamber.

A coil spring 310 is mounted in a cylindrical cavity 311 in valve body 301 and bears against a spring seat 312 carried at the reduced diameter end 313 of stem 303. An O-ring 314 is disposed around stem portion 313, and is loosely received between a flange 315 on bushing 306 and a gasket 317. A plug 318 is threadably received within valve body 301 and bears against a flexible gasket 319. Plug 318 supports stem 303 for axial movement with respect thereto. Radially extending outlet openings 320 are provided in stem 303 for discharging liquid fuel in atomized form into the passage 166 leading to the combustion chamber.

The metered charge of liquid fuel within metering chamber 308 is placed in fluid communication with passage 305, when stem 303 is moved inwardly since openings 320 are disposed to the left of gasket 319, and the liquified gaseous fuel expands into the combustion chamber through passages 305 and 166. When the stem 303 is shifted to the right, as viewed in FIG. 10, under the influence of spring 310, the inclined portin of stem 303 moves away from O-ring 314 and a fresh charge of liquid fuel passes into chamber 308 between stem portion 313 and O-ring 314.

Metering valve body 301 is associated with liquified gas container 330 by the insertion of inlet stem 302 within an outlet passage 331 at the upper end of container 330. The outlet passage 331 is associated with a conventional valve 332, forming no part of the present invention. The container 330 is preferably formed of metal to provide appropriate bursting strength, and supported within container 330 is a bag 333 of generally cruciform shape which has a threaded upper end 334 threadably associated with valve 332. Bag 333 is collapsible, and contains therewithin a given volume of liquified gas. A suitable propellant 335, such as propane, is provided between the bag 333 and the inner wall of container 330 for applying pressure to bag 333 for expelling liquid fuel outwardly of valve 332, and into the metering valve through inlet passage 304.

In most preferred embodiments of the invention a suitable lubricating medium is associated with, and dispersed within the liquid fuel in bag 333. The lubricating medium may take the form of a lubricating oil, which is mixed as a minor percent with the liquid gas in bag 333. It has been found that such a lubricating medium not only does not significantly detract from ignition of the liquid fuel in the combustion chamber or from flame propagation therewithin, but also reduces wear on the moving parts thus prolonging the useful life of the metering valve and other moving parts of the tool.

A portable gas-powered tool with this novel linear motor can be used for a variety purposes, depending on the attachments connected to the motor. For example, as illustrated in the embodiments of FIGS. 2–5 and 6–7, it can be used to drive fasteners. Also, of course, attachments can be connected to the working member of the linear motor for shearing tree limbs, connecting hog rings, animal tags, piercing holes, marking metal plates, etc. In substance, it can be used anywhere where a large force is required. As stated, this tool is fully portable, can be light in weight, and thus can be used anywhere independent of the need for an external source of power, such as compressed air.

The novel motor is made possible in a relatively small portable tool by the creation of turbulance in the combustion chamber prior to and during combustion. This has not been done before in a portable tool and while it is acknowledged that internal combustion engines are notoriously old, these all require an external source of power in order to start the engine. The fan causes the air and fuel to be mixed to a generally homogeneous state under atmospheric conditions, and continued operation of the fan increases the burning speed of the fuel-air mixture in the combustion chamber prior to and during movement of the working member. In this tool, no external source of power is required and starting of the tool is totally independent of movement of the working member. This tool utilizes liquified gas, and thus is very economical to operate. Actually, it is about one half the cost of operating a pneumatic tool powered by a gasoline driven air compressor. As stated above, a relatively small portable tool adaptable for many uses can be designed employing the invention.

Thus, it will be appreciated from the foregoing description that the present invention provides an improved portable tool operated by a linear motor which has many advantages and improvements. While the invention has been described in conjunction with several embodiments, it is intended that many alternatives, modifications, and variations will be apparent to those skilled in the art. Accordingly, it is intended to cover by the appended claims all such alternatives, modifications, and variations that are within the spirit and scope of the invention.

What is claimed is:

1. A self-starting portable tool comprising a housing, a cylinder in said housing, a piston in said cylinder and forming a motor member, a working member attached to said piston, a combustion chamber formed within said housing and having said piston defining a wall portion thereof, a turbulence generator in said chamber, means for supplying fuel and air to said chamber, means for operating said generator independent of said piston such that premixing and turbulence are imparted to the air and fuel in said chamber before initial ignition of the mixture in said chamber and before initial movement of said piston, and means for igniting and exploding said mixture in said combustion chamber to [deive] *drive* said piston to operate said working member, whereby the initial and all subsequent strokes of the motor member are operated at [substantiall] *substantially* full energy output and further wherein the turbulence generator consists of a fan disposed in said chamber and the means for operating said generator includes an electric motor self-contained within said housing and connected to said generator.

2. A portable tool in accordance with claim 1 including means for returning the piston to its driving position after it has been driven.

3. A portable tool in accordance with claim 2 including means for admitting air under ambient pressure to the underside of the piston when it is in its driven position such that the pressure differential between the ambient pressure on the underside of the piston and the lower pressure on the other side of the piston is effective to return the piston to its driving position.

4. A portable tool in accordance with claim 2 including means for retaining the piston in its driving position after it has been returned thereto.

5. A self-starting portable tool comprising a housing, a cylinder in said housing, a piston in said cylinder and forming a motor member, a working member connected to said piston, a combustion chamber formed within said housing and having said piston defining a wall portion thereof, means providing axially disposed inlet and exhaust ports to said combustion chamber for admitting air and for discharging the products of combustion, a turbulence generator in said chamber axially disposed between said inlet and exhaust ports, means for supplying fuel to said chamber, means for operating said generator independent of said piston such that premixing and turbulence are imparted to the air and fuel in said chamber before initial ignition of the fuel in said chamber and before initial movement of said piston, and means for igniting and exploding the mixture in said combustion chamber to drive said piston to operate said working member and further wherein the turbulence generator comprises a fan having its axis axially disposed in said chamber, which fan serves to scavenge said chamber after firing by directing air from said inlet port through said exhaust port, and the means for operating said generator includes an electric motor self-contained within said housing and connected to said generator.

6. Apparatus in accordance with claims 1 or 5 in which the means for supplying fuel to said chamber is a metering valve mechanism wherein a prescribed amount of fuel is supplied to said combustion chamber.

7. Apparatus in accordance with claims 1 or 5, wherein the means for igniting said fuel includes a spark plug powered by a piezo-electric device.

8. Apparatus in accordance with claims 1 or 5, including trigger operated means for operating the means for supplying fuel to said chamber and for igniting said fuel to drive said motor member.

9. A portable tool in accordance with claim 5 in which the combustion chamber is opened and closed by a valve means that coacts with said inlet and exhaust ports, and means for effecting movement of said valve means to close off said chamber prior to ignition and open said chamber after the working member has been driven to facilitate scavenging of said chamber.

10. A portable tool in accordance with claim 9 in which the valve means includes a slidable sleeve that cooperates with the housing to effect opening and closing of the inlet and exhaust ports.

11. Apparatus in accordance with claims 9 or 10, including trigger operated means for (1) operating said valve means to control the opening and closing of said combustion chamber, (2) operating the means for supplying fuel to said chamber, and (3) for igniting said fuel to drive said motor member.

12. A portable tool in accordance with claims 9 or 10 including trigger operated means for operating said valve means to control the opening and closing of said combustion chamber.

*13. A self-starting portable tool comprising*

*a housing,*

*an elongated cylinder in said housing,*

*a piston having an upper face and a lower face, said piston being mounted in said cylinder to be driven between an upper position of rest and a lowermost position and forming a motor member,*

*a working member attached to said piston,*

*a combustion chamber formed within said housing and having the upper face of said piston defining a wall portion of said combustion chamber,*

*means for providing a fuel and air mixture in said chamber,*

*means for igniting and exploding said mixture in said combustion chamber to drive said piston through a driving stroke from said upper position to said lowermost position to operate said working member,*

*and return means for causing said piston to move upwardly from said lowermost position to said upper position of rest, said return means including outlet means in said elongated cylinder between its ends for communicating said cylinder with ambient atmosphere and being disposed below said upper position of rest and above said lowermost position of said piston, such that when said piston is driven towards said lowermost position, said piston moves past said outlet means thereby to place said combustion chamber in communication with said outlet means to exhaust a portion of combustion gases from said combustion chamber to ambient atmosphere and cause a reduction in temperature of the combustion gases remaining in the combustion chamber, and*

*said return means further including bumper means at the lower end of the cylinder for initially moving said piston upwardly from said lowermost position, said combustion chamber above said upper face being out of communication with ambient atmosphere during the further return of said piston to said upper position of rest, said further return of said piston to said upper position of rest being substantially caused by throughout further such return, said return means producing an upwardly acting pressure differential on said upper and lower faces of said piston induced by the reduction in temperature of the combustion gases above the upper face to produce a sharp reduction of pressure in said combustion chamber to below ambient pressure.*

*14. A self-starting portable tool in accordance with claim 13, and wherein said outlet means comprises a plurality of ports.*

*15. A self-starting portable tool in accordance with claim 13, and wherein said outlet means is located in the lower end of the cylinder.*

*16. A self-starting portable tool in accordance with claim 13, and wherein said outlet means is in communication with ambient atmosphere when said piston is both thereabove and therebelow through an exhaust valve which opens in response to an elevation in the pressure internally of said cylinder at said outlet means above ambient pressure, which closes in response to a reduction to ambient pressure internally of the cylinder in the zone of said outlet means, and which remains closed under the influence of the reduction of pressure during the further return of the piston to the upper position of rest.*

*17. A self-starting portable tool in accordance with claim 16, and wherein said exhaust valve is adapted to open in response to movement of said piston downwardly during the driving stroke towards said outlet means, as well as in response to exposure to the elevated pressure of the combustion gases in said combustion chamber when said piston moves downwardly past said outlet means.*

*18. A self-starting portable tool in accordance with claim 13, and wherein said bumper means comprises a superatmospheric air bumper in the lower end of said cylinder which is generated after said piston moves downwardly past said outlet means, and one-way valve means in said cylinder below said outlet means for opening and communicating with ambient atmosphere when the pressure in the cylinder below the piston drops below ambient pressure.*

*19. A self-starting portable tool in accordance with claim 16, and wherein when the piston moves downwardly past said outlet means, there is rapid exhausting of the combustion gases therethrough and the exhaust valve is rapidly reclosed, rapid further temperature reduction of remaining combustion gases in the combustion chamber causing a sharp reduction in the pressure of the combustion gases*

*above the piston, the differential between that pressure and ambient pressure below the piston inducing said further return of the piston to its upper position of rest.*

*20. A self-starting portable tool as set forth in claim 13, including exhaust valve means in communication with said outlet means for exhausting air beneath the piston as it moves through its driving stroke, the portion of the cylinder below said exhaust valve means, the piston lower face and the housing adjacent the bottom of the cylinder providing a sealed compression chamber whereby the air below the piston and exhaust valve means is compressed to form an air bumper to prevent the piston from contacting the housing adjacent the bottom of the cylinder, said air bumper comprising said bumper means.*

21. A self-*starting portable tool as set forth in claim 20, in which the portion of the housing adjacent the bottom of the cylinder includes at least one one-way check valve which opens to introduce ambient air to assist in returning the piston to its upper position of rest after it has been driven and the combustion gases have been exhausted and a pressure below ambient pressure exists above the upper face of the piston.*

* * * * *

UNITED STATES PATENT AND TRADEMARK OFFICE

CERTIFICATE OF CORRECTION

PATENT NO. : RE32,452

DATED : July 7, 1987

INVENTOR(S) : Milovan Nikolich

It is certified that error appears in the above-identified patent and that said Letters Patent is hereby corrected as shown below:

In the Abstract, last line, following the word "acting" insert --against the underside of the linear motor. The unique use of the electric fan improves the overall operational efficiency of the tool and the utilization of the liquified combustible gas.--

At column 10, line 42, correct "operated" to read --opened--.

Signed and Sealed this

Sixteenth Day of February, 1988

*Attest:*

*Attesting Officer*

DONALD J. QUIGG

*Commissioner of Patents and Trademarks*